US008816864B2

(12) United States Patent
Menachem et al.

(10) Patent No.: US 8,816,864 B2
(45) Date of Patent: Aug. 26, 2014

(54) LOW POWER DEVICE AND METHOD FOR LIVESTOCK DETECTION

(75) Inventors: Uri ben Menachem, Netanya (IL); Eyal Brayer, Kfar Monash (IL); Shay Levy, Petach Tikva (IL)

(73) Assignee: SCR Engineers Ltd., Netanya (IL)

( * ) Notice: Subject to any disclaimer, the term of this patent is extended or adjusted under 35 U.S.C. 154(b) by 345 days.

(21) Appl. No.: 13/231,107

(22) Filed: Sep. 13, 2011

(65) Prior Publication Data

US 2012/0112917 A1 May 10, 2012

Related U.S. Application Data

(60) Provisional application No. 61/382,655, filed on Sep. 14, 2010.

(51) Int. Cl.
| | |
|---|---|
| *G08B 23/00* | (2006.01) |
| *G01S 13/76* | (2006.01) |
| *A01K 11/00* | (2006.01) |
| *A01K 29/00* | (2006.01) |
| *G01S 5/12* | (2006.01) |

(52) U.S. Cl.
CPC ............. *A01K 11/008* (2013.01); *G01S 13/767* (2013.01); *A01K 29/005* (2013.01); *G01S 5/12* (2013.01)
USPC .................... 340/573.3; 340/7.32; 340/10.33; 340/10.34

(58) Field of Classification Search
CPC ...... A01K 11/006; G01S 13/767; H02J 9/005
See application file for complete search history.

(56) References Cited

U.S. PATENT DOCUMENTS

| | | | | |
|---|---|---|---|---|
| 2002/0036569 | A1* | 3/2002 | Martin ........................ | 340/573.1 |
| 2006/0100001 | A1* | 5/2006 | Pratt et al. .................... | 455/574 |
| 2009/0128358 | A1* | 5/2009 | Tuval ....................... | 340/825.49 |
| 2009/0315679 | A1* | 12/2009 | Bauchot et al. .............. | 340/10.1 |
| 2011/0080269 | A1* | 4/2011 | Wagner ...................... | 340/10.33 |
| 2011/0298619 | A1* | 12/2011 | O'Hare et al. ............. | 340/573.1 |
| 2013/0038856 | A1* | 2/2013 | Williams et al. ............. | 356/3.12 |

* cited by examiner

*Primary Examiner* — Steven Lim
*Assistant Examiner* — Omeed Alizada
(74) *Attorney, Agent, or Firm* — The Law Office of Michael E. Kondoudis

(57) ABSTRACT

A system and method of tracking animal livestock using electronic frequency signal transmitters and receivers is herein presented. The system involves electronic tags attached to the bodies of livestock. The tags transmit a signal which conveys the location or other pertinent information regarding the status of the animal. The signals are picked up by a receiver attached to a stationary platform, or located in a vehicle, or in a portable hand held receiver device. The information transmitted can be used to locate a specific animal or can be used to monitor the status and condition of the animal. The device contains several modes which minimize power consumption and maximize power supply lifetime.

64 Claims, 4 Drawing Sheets

LOW POWER DEVICE AND METHOD FOR LIVESTOCK DETECTION

This application claims priority to U.S. Provisional Application Ser. No. 61/382,655 filed Sep. 14, 2011. The entirety of this application is hereby incorporated herein by reference in its entirety.

BACKGROUND

Anyone who ever saw a cowboy try to catch a cow using a rope knows that fetching an individual farm animal was always one of the toughest jobs on the farm. Approaching an individual farm animal is needed for various reasons; breeding and veterinary treatments are the most common ones. As the number of animals living on a farm increases, more data is collected on individual animals. Needs to approach or fetch specific animals are growing. Therefore, a reliable and cost-efficient solution to the problem of locating a specific animal is needed in the art.

In many prior disclosures, a location of animals is provided by an earth-orbiting satellite system. Such a system requires high power consumption from the device attached to the animal during communication and also requires line of sight between the animal and the satellites.

Other disclosures based on absolute pinpoint of an animal's location in a predefined coordinate system requires an expensive pre-installed array of antennas in the farm. The power consumption of such devices attached to the animal during communication is high because the device must transmit data for periods of minutes in order to enable accurate tracking.

Prior disclosures using RFID passive tags have been attached to the animal's ear or inserted into the stomach. Such devices do not contain a battery and theoretically have an endless lifespan. Such devices can be detected from only a very short range, such as, less than 1 m and can only find an animal confined to a very narrow space or passage.

A farmer or dairyman needs a system that can find an animal moving freely in a large confined area from a large distance of tens or even hundreds of meters. A transmitting device attached to the cow is an obvious choice in order to be practical and cost efficient. Such a device must have a very long life span because attaching the device to an animal is a very time consuming and tedious job.

What is currently needed in the art is a system and apparatus for identifying an individual animal in a group of animals in a paddock or pen by use of a device that consumes very low power. Such a device offers the advantage of being able to operate continuously for years using a small battery and thus requiring little or minimal battery replacement.

BRIEF DESCRIPTION

In accordance with one aspect of the present exemplary embodiment, the present application is a series of RFID transponders and receiving devices for tracking barnyard animals. The system involves electronic tags attached to the bodies of livestock. The signals are picked up by a receiver attached to a stationary platform, or located in a vehicle, or in a portable hand held receiver device. The information transmitted can be used to locate a specific animal or can be used to monitor the status and condition of the animal. The device contains several modes which minimize power consumption and maximize power supply lifetime.

DETAILED DESCRIPTION

Figure 1:
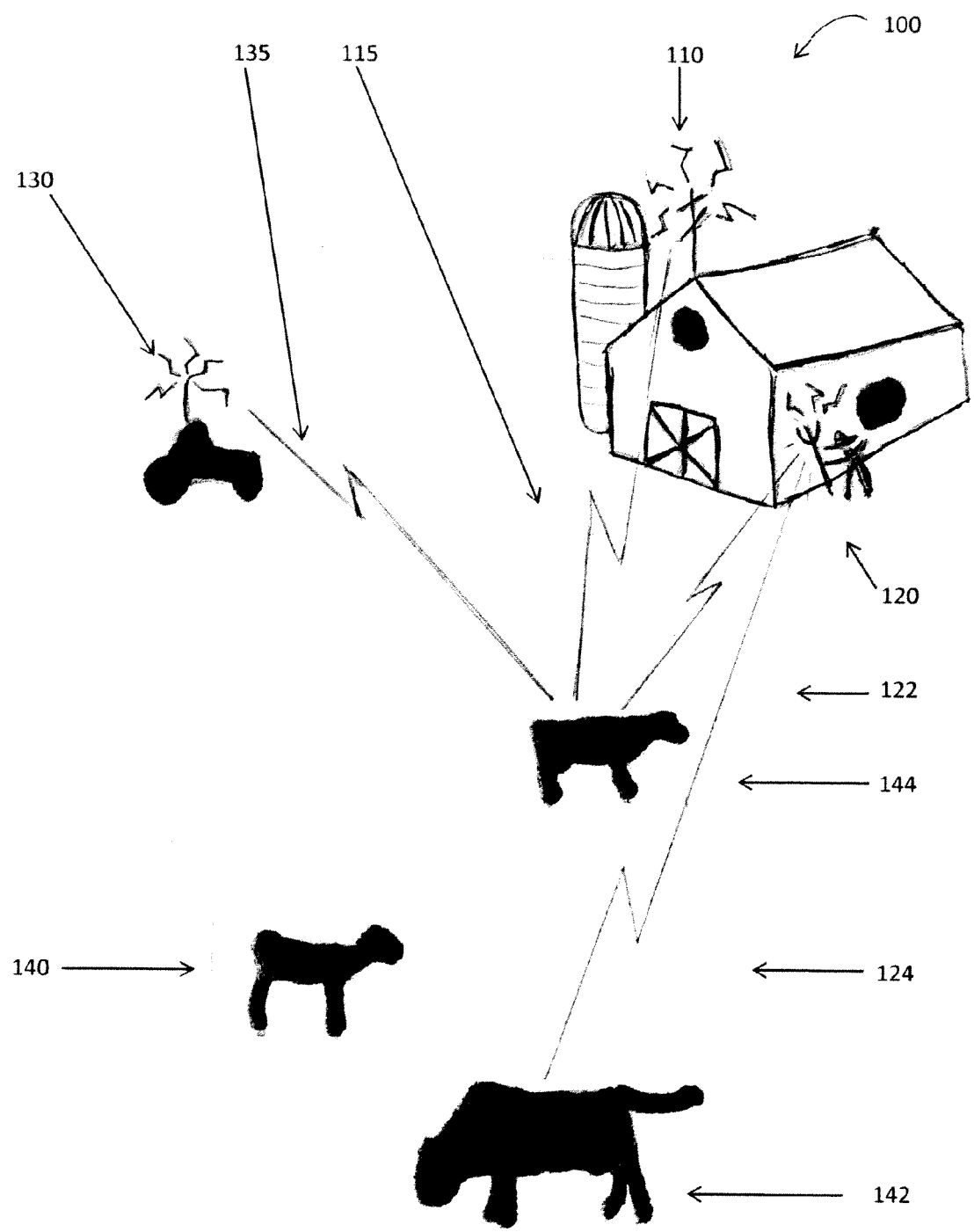
FIG. 1 is an illustration of the signal path of the device.

FIG. 1 illustrates the concept presented in the current application 100. One object of the present invention to provide a novel, low power consuming device for attachment to a farm animal 140, 142, 144 which may be able to receive and transmit signals 115, 122, 124, 135 to and from remote receivers and/or transmitters. While the present application is directed toward farm animals such as but not limited to cows, bulls, steers, cattle, horses, goats, pigs, sheep, llamas, alpacas, chickens, hens, roosters, turkeys and any other birds, the present application may easily be applied to zoo animals such as elephants, rhinos, giraffes, or animals residing in the wild such as tigers, lions and bears.

One embodiment would include at least one mobile handheld approaching unit 120. Another embodiment would contain at least one stationary 110 receiving and/or transmitting system. A further embodiment would have the receiver/transmitter mounted in a vehicle 130. The device would be employed to approach an individual animal in a shed, a pen, or a paddock, either standing alone or staying with a group of animals in an economical and efficient way.

An Animal Receive/Transmit Unit or simply ARTU, comprises a mobile tag mounted or attached to an animal to receive/transmit data. The ARTU must be lightweight, small and consume little electrical power to limit the time consuming operation of recharging or replacing a battery. Replacement of a battery also limits the reliability of the ARTU because of risk of sealing damage or improper handling. This is exacerbated when battery charging is done in a farm or a dairy environment. An object of the present disclosure is to provide the ARTU with very low average power consumption, combined with responsiveness to the FLS and optionally the CBS which is simple, reliable and responsive to a fast approaching animal.

A Coarse Base Station or simply CBS is a stationary unit, mounted in the farm, diary, open yard, stable or any other area where the animal is expected to stay or pass through. The device may receive/transmit data from/to the ARTU, as well as registering said specific ARTU data such as identity, time, and distance from stationary units and azimuth, at pre-defined intervals. The device is mounted, but may be placed in a mobile vehicle.

A Fine Locating System, or simply FLS is a hand held receiver. This mobile, handheld approaching unit is used to receive/transmit data from/to the ARTU and from/to the CBS. The FLS is optionally provided with human-machine interface such as speaker, screen, LED array, and alike, to enable interactive approaching the specific animal, by a human operator. The ARTU attached to the animal is located by the FLS through use of a directional antenna or directional array of antennas (referred to as DAN).

The data gathered by the receiving and transmitting may be stored in a computer operable database and analyzed using a computer processor that performs calculations and comparisons of data with stored established standard values. The system may also include a clock that records the time and date that the data is received and transmitted. The computer operable system may also transmit information over a network such as but not limited to the Internet in order to facilitate remote monitoring of the animals.

Figure 2:
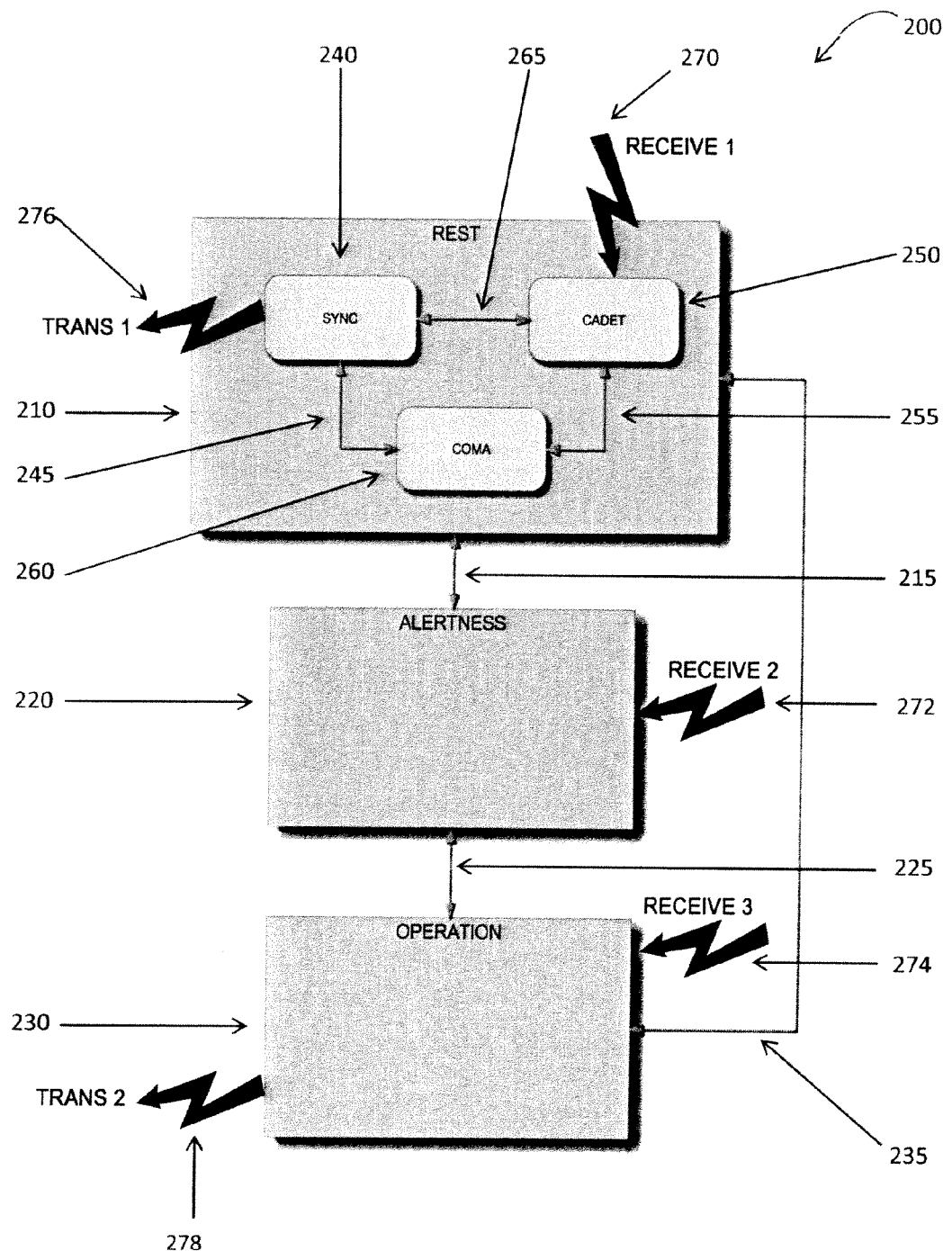
FIG. 2 is an illustration of the interconnected modes and phases.

FIG. 2 presents the operating modes of the present application 200. One aspect of the present disclosure is to provide a lightweight, robust and low power consuming ARTU, comprising at least one electric power source, at least one receiving antenna, at least one transmitting antenna such that the receiving antenna and transmitting antenna may be same antenna, and at least one logic device able to store/process/manipulate data being received from external sources, as well as monitoring power level, power consumption rate, power consumption patterns, and duration of pulses. Said ARTU is characterized by three operation modes: The rest mode 210 is characterized by typical very low average power consumption of less than 1 milli-Watts (mW), more preferred less than 0.1 mW and most preferred less than 0.05 mW. It is an object of the present invention to provide said very low power consumption by switching between three different phases of the rest mode:

The coma phase 260 is characterized by very low power consumption of less than 0.1 mW, more preferred less than 0.05 mW, and most preferred less than 0.02 mW. The ARTU is being in this phase for at least 50% of the time, more typically at least 90% of the time and specifically at least 99% of the time. The low power consumption obtained by the ARTU is neither transmitting nor receiving signals from/to external units.

The cadet phase 250 is characterized by power consumption of less than 2000 mW, more preferred less than 200 mw and most preferred less than 100 mW, and the ARTU is being in this phase for at most 10% of the time, more typically at most 2% of the time and specifically at most 1% of the time. The ARTU is receiving signals from external sources such as the CBS, FLS or others. In a preferred embodiment, the ARTU becomes Cadet approximately every 1-1000 seconds; said period varies from 0.001 millisecond (ms) to 10 seconds. During cadet mode, the device is open to receive activating pulses 270, commands, order, or other signals that are processed and may order it to become alert or operative according to a pre-defined programming, or due to request by operator of the FLS or optionally the CBS. Cadet is connected 255 to the coma phase 260.

The synch phase 240 is characterized by power consumption of less than 2,000 mW, more preferred less than 200 mW and most preferred less than 100 mW, and the ARTU is being in this phase for at most 10% of the time, more typically at most 2% of the time and specifically at most 1% of the time. The ARTU is transmitting signals to external receiving unit such as the CBS, the FLS or others. In a preferred embodiment, the ARTU are synced every 1-100,000 seconds, sync period is typically less than 10 seconds. Sync period is characterized by a transmission of unique signals 276 from the ARTU. Said signal enables the FLS and/or CBS to recognize said specific ARTU, to provide useful data regarding specific ARTU and to establish time points for next cadet period or to order the ARTU to become Alert or Operative (see below). For example, the ARTU is transmitting a sync signal every 10-30 minutes. Said signal is being used as a time marker. As such, each relevant ARTU will have a "conference call" at specific pre-determined time point according to a pre-defined protocol. During said sync period, the coarse location of the specific ARTU is detected, registered, and stored by the CBS. The synch phase 240 is connected 265 to the cadet phase 250 and is connected 245 to the coma phase 260.

A second module is the alertness mode 220. It is connected 215 to the rest mode 210. An object of the present invention to provide a mode of very power efficient and is responsive to receive commands/requests from the FLS and/or CBS. The term "responsive" means that the chance for obtaining commands from FLS/CBS is increased relative to Cadet phase during rest mode. Power consumption is higher during alertness mode, so alertness should be selected when the need to approach the specific animal is urgent and time is immediate. In a preferred embodiment, the ARTU becomes open to receive signals every 0.01-100 seconds, or more preferred 1-10 seconds, and said period of "open to receive signals" 272 is typically less than 10 seconds. By limiting the "open to receive signals" period of duration, average power consumption of the ARTU is kept very low. Unlike rest and operation modes, alertness mode is optional and in many embodiments an ARTU is switched between rest and operation modes. Alertness mode is characterized by typical low average power consumption of less than 10 mW, and may also consume less than 1 mW. A most preferred embodiment consumes less than 0.5 mW. It is another object of the present invention to enable registration of coarse position of the ARTU via at least 2 CBS units measuring signal power and/or propagation time between said ARTU and each CBS units, during alertness mode. Since communication between ARTU and CBS units during alertness mode is more frequent than rest mode, the accuracy if coarse positioning of ARTU may be improved by averaging of multiple readings. In one embodiment, said ARTU being in alertness mode is transmitting to two or more CBS units for every 0.1-5 seconds.

The operating mode 230 is linked 225 to the alertness mode and linked 235 to the rest mode 210. The operation mode 230 contains the ARTU transmitting signals 278 at pre-defined rates and patterns, so FLS and/or CBS can easily trace it and enable the user operating the FLS to approach the specific ARTU and the animal that said ARTU is attached to. Signals may also be received 274. Typical transmission pattern that provides efficient tracking of said ARTU is transmitting unique signals every 0.001 to 1000 millisecond (ms). One embodiment transmits every 0.01 ms to 10 seconds, whereas signal pulse duration may vary from 0.00001 to 500 ms or vary from 0.001 to 1 ms. In one preferred embodiment, approaching a specific active ARTU by FLS carried as a handheld mobile unit by a user is obtained by directing the FLS toward maximal power reception. Duration of said period may vary depending on the user of the system. This mode is characterized by typical very low average power consumption of less than 3 mW. A preferred mode consumes less than 0.3 mW and most preferred less than 0.15 mW.

Since this event is not very frequent, power consumption in this mode is similar to other known in art technologies, but due to the very short period, the contribution to average power consumption is low. Usually, even if approaching an ARTU is done few times per week, more typically up to 200 times per year, the average power consumption remains lower than 0.6 mW, and may be less than 0.2 mW.

Since the contribution of operation mode to power consumption is low, average long term power consumption is defined as the average power consumption during rest mode, measured for period of 1 week, in field operation, and is referred to by ALTP.

According to a pre-defined protocol and/or external command or signal, the ARTU can switch from each of the above-mentioned modes to any of said modes, for example, from rest directly to operation or in another example from cadet back to coma.

The three basic phases of rest mode are provided. The ARTU can switch between the 3 phases according to a pre-defined procedure, or can be re-programmed during cadet phase by receiving commands from the FLS or optionally CBS. The RECEIVE 1 symbol 270 represents signals from the CBS/FLS or other devices that are received by the ARTU during its cadet phase. The TRANS 1 symbol 276 represents signals transmitted from the ARTU during sync period. The RECEIVE 2 symbol 272 represents signals from the CBS/FLS or other devices that are received by the ARTU during its alertness phase. Signals are either activating the ARTU to become "operative" meaning being in operation mode or order it to become alertness or rest again. The RECEIVE 3 symbol 274 represents signals from the CBS/FLS or other devices that are received by the ARTU during its operation mode. Said signals are commanding the ARTU to stay at operation mode or to switch to rest again. The TRANS 2 symbol 278 represents signals transmitted from the ARTU during the operation period and are usually identified and processed by the FLS for the approaching procedure.

In one embodiment, the transmissions and receiving are carried at radio frequency range of 0.3-20 GHz. Due to the low power consumption, the ARTU according the present invention may be operated by battery, typically of 500-5000 mAh (milliamper-hour), for period of 2 years typically, with a maximum battery life of 5 years or more.

Another object of the present invention is to provide a power saving and time saving method for approaching an individual animal, by registering the ARTU location, every time the ARTU is transmitting signal toward the CBS, at CBS or at central data system. The specific "zone" or "coordinate" is stored. Event of transmission occurs every time ARTU provides a sync signal. When searching the specific animal with the FLS, the search is focused to the last registration "zone" or "coordinate" that can be found relative to azimuth and distance from one or more CBS or the intersection point of two or more CBS's. The pre-registration and the resulting focused search shorten the approaching time and thus saving power of the ARTU. This saves time of a farmer, dairyman or veterinarian and may save life of animal in a case of emergency.

Figure 3:
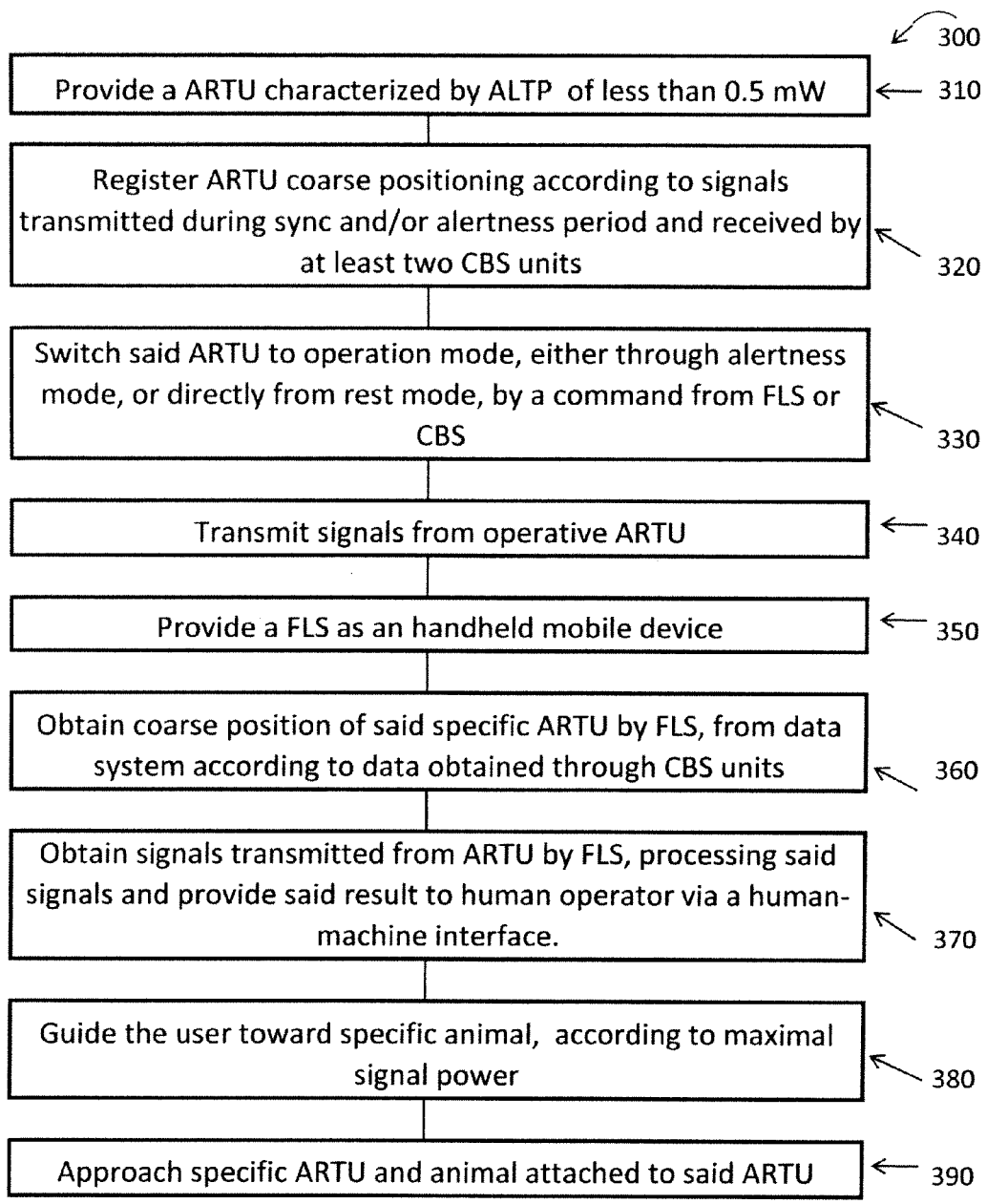
FIG. 3 is a flow chart of the method of use.

FIG. 3 presents the method of operation 300. Another object of the present invention is to provide a method for approaching an individual animal in a group of animals, located in a paddock or in a pen. Said method comprises the following steps:

Providing an ARTU attached to an individual animal, characterized by ALTP of less than 0.5 mW 310.

Optionally, registering an ARTU coarse positioning according to signals transmitted during sync and/or alertness period and received by at least two CBS units 320.

Switching said ARTU to operation mode, either through alertness mode or directly from rest mode during cadet phase, by a command from FLS and/or CBS 330.

Transmitting signals from operative ARTU 340.

Providing a FLS as a handheld mobile device 350.

Optionally, obtaining coarse position at FLS of said specific ARTU, from data system according to data obtained through CBS units 360.

Obtaining signals transmitted from ARTU by FLS, processing said signals and providing said result to human operator via a human-machine interface 370.

Guide human operator toward specific animal, according to maximal signal power 380.

Approaching specific ARTU and animal attached to said ARTU, 390.

ARTU comprises a battery power source of 2000 mAh. One type of battery that may be used is a lithium battery to power a low power microprocessor (MP) such as, but not limited to, MSP430 USA, RF module such as ZIGBEE module at frequency of 2.4 GHz, manufactured by TI from USA. The frequency of the omnidirectional antenna is in the frequency range of 2.4-2.5 GHz. The antenna is inside a plastic or metal enclosure to protect said components from dirt and humidity. The ARTU is attached to an animal by any means providing long lasting operation. The ARTU average current consumption during coma phase is less than 40 micro Watts, since the RF module is off such that transmission is disabled. During cadet and sync phases, the ARTU average power consumption is less than 40 mW. The difference from coma phase is because the RF module is on so that receiving and transmission is enabled.

The time allocation between phases in rest mode is approximately every 2 minutes the ARTU switches from coma to cadet and stays at cadet phase for about 5 milliseconds. Under this combination, average power consumption of rest mode may be less than 40 microwatts because of the short periods of cadet mode. Approximately every 10 minutes the ARTU transmits sync signal for providing FLS and, optionally, CBS, an animal-specific data, including identity, time, power status and alike, as well as opportunity for CBS units to calculate coarse location of the ARTU. The sync period enables the FLS to provide ARTU commands, such as, for setting an accurate time slot for next communication event, command to become operative or alertness, and also optionally enables registration of coarse location via CBS system.

The ARTU is activated to alertness mode by receiving a specific command from mobile handheld antenna (FLS) and/or CBS during its cadet phase. During alertness mode, the ARTU becomes open to receive/transmit RF once a second for period approximately 5 milliseconds. Power consumption during alertness mode is less than 400 microwatts. The advantage of alertness mode over cadet mode is by increasing readiness of the ARTU to obtain commands from mobile handheld antenna and/or CBS, and to provide more time for CBS units for calculating position of the ARTU.

Figure 4:
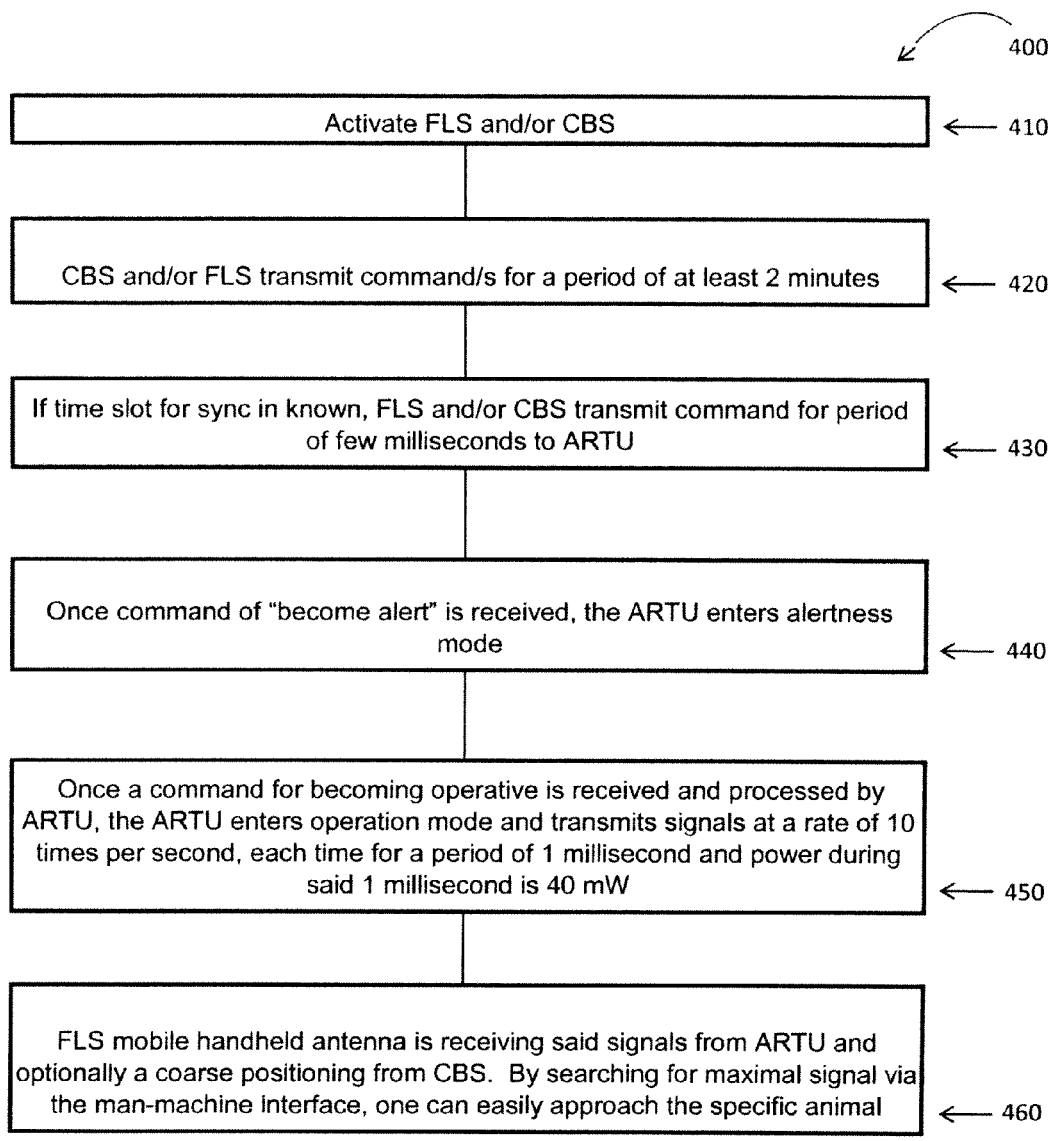
FIG. 4 is flowchart of the method of using the Handheld antenna based device.

FIG. 4 presents a method 400 of using the hand held FLS for approaching an animal. The handheld antenna such as FLS unit for approaching the ARTU comprises a directional antenna in the frequency range of 2.4-2.5 GHz such as microstrip, phased array or horn, a power source—usually a battery, a microprocessor or computer and a man-machine interface, such as speakers or display, for providing feedback on signal level and thus enabling approaching the specific animal.

The approaching procedure in the specific example comprises the steps:

a) Activating FLS and/or CBS, 410 b) CBS and/or FLS are transmitting command/s for a period of at least 2 minutes, 420.

c) Optionally to (2) if a time slot for sync in known, FLS and/or CBS are transmitting command for period of few milliseconds to ARTU, 430.

d) Optionally, once a command of "become alert" is received, the ARTU enters alertness mode, 440.

e) Once a command for becoming operative is received and processed by ARTU, the ARTU enters operation mode and transmits signals at a rate of 10 times per second, each time for a period of 1 millisecond and power during said 1 millisecond is 40 mW, 450.

f) FLS mobile handheld antenna is receiving said signals from ARTU and optionally a coarse positioning from CBS. By searching for maximal signal via the man-machine interface, one can easily approach the specific animal, 460.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A system for locating an animal comprising:
   at least one Animal Receive/Transmit Unit (ARTU) operative to receive/transmit data; and
   at least one Coarse Base Station (CBS) operative to receive/transmit said data from/to said ARTU;
   said system having at least two modes of operation: a rest mode and an operating mode; said operating mode is characterized by said ARTU receiving data and transmitting data;
   said rest mode is characterized by at least three phases: a coma phase, a synch phase and a cadet phase; wherein, in said coma phase, said ARTU is incapable of receiving data and is incapable of transmitting data;
   wherein said ARTU is in said coma phase for a first predetermined period of time, such that said ARTU is transformable from said coma phase after said first predetermined period of time;
   further wherein, during said synch phase, said ARTU performs at least one of a group consisting of: establishes time points for entry into the next said cadet phase, and is ordered by the CBS to become alert or operative.

2. The system according to claim 1, additionally comprising a Fine Locating Unit (FLS) communicating with at least one of said CBS and said ARTU.

3. The system according to claim 1, wherein said CBS is selected from a group consisting of a unit attached to a stationary platform and a mobile unit.

4. The system according to claim 1, wherein communication between said CBS and said ARTU is by means of an antenna selected from a group consisting of: a directional antenna, an omni-directional antenna, a directional array of antennas and any combination thereof.

5. The system according to claim 4, wherein said antenna operates at a frequency in a range between 2.4 GHz and 2.5 GHz.

6. The system according to claim 1, wherein the data transmitted/received between said CBS and said ARTU include at least one of animal location and animal condition.

7. The system according to claim 1, wherein at least one of a group consisting of said CBS, and said ARTU performs at least one of a group consisting of: presents the user with specific directions to locate an individual animal and plots the location of at least one animal on a coordinate system.

8. The system according to claim 1, wherein said ARTU switches between said synch phase, said coma phase, and said cadet phase in said rest mode after predetermined periods of time.

9. The system according to claim 1, wherein said CBS is capable of receiving from said animal and registering information including identity, animal condition, time, distance and azimuth from the base station unit.

10. The system according to claim 1, wherein said ARTU is attached to said animal.

11. The system according to claim 1, wherein said cadet phase is characterized by power consumption being less than 100 mW.

12. The system according to claim 1, wherein said cadet phase is activated every 1 to 1000 seconds for a period of time between 0.001 and 10 seconds.

13. The system according to claim 1, wherein said rest mode has power consumption less than 100 mW, and said operating mode has power consumption less than 100 mW.

14. The system according to claim 1, additionally comprising a power source, wherein the lifetime of said power source is at least 1 year.

15. The system according to claim 14, wherein said ARTU additionally comprises at least one programmable logic device capable of at least one of:
   storing and processing received data;
   monitoring power level of said power source, monitoring power consumption pattern, storing power consumption pattern, monitoring animal condition storing animal condition, monitoring duration of signal pulses and storing duration of signal pulses.

16. The system according to claim 1, wherein said ARTU is capable of receiving data during said cadet phase.

17. The system according to claim 1, wherein said ARTU further comprises an alertness mode, and wherein, during said alertness mode, said ARTU is capable of transmitting data and of receiving data.

18. The system according to claim 1, wherein said ARTU is a mobile tag mounted on or attached to said animal.

19. A method for finding and approaching an individual animal comprising:
   providing at least one low powered Animal Transmit/Receive Unit (ARTU) operative to receive/transmit data;
   providing at least two coarse base station units (CBS);
   measuring and registering the location of said ARTU based on at least one of signal power and signal propagation time between said ARTU and said at least two CBS; and
   improving the accuracy of coarse positioning of said ARTU by means of a member of a group consisting of (a) measuring and registering said location of said ARTU multiple times and (b) averaging said multiple measured locations and any combination thereof,
   said ARTU having at least two modes of operation: a rest mode and an operating mode; said operating mode is characterized by said ARTU receiving data and transmitting data;
   said rest mode is characterized by at least two phases, a coma phase and a synch phase; wherein, in said coma phase, said ARTU is incapable of receiving data and is incapable of transmitting data;
   wherein said ARTU is in said coma phase for a first predetermined period of time, such that said ARTU is transformable from said coma phase after said first predetermined period of time.

20. A method for livestock detection employing a low powered Animal Receive/Transmit Unit (ARTU), the method comprising:
   providing at least one ARTU operative to receive/transmit data and characterized by being operative to provide data regarding at least one of animal location and animal condition;
   enabling communication between said at least one ARTU and at least two base station units (CBS) by:
   switching to at least one of the alert mode and the operating mode;
   transmitting from said ARTU to said at least two CBS units; and
   measuring and registering the location of said ARTU based on at least one of a group consisting of: signal power, direction and range between said ARTU and said at least two base station units (CBS)
   said system having at least two modes of operation: a rest mode and an operating mode; said operating mode is characterized by receiving data and transmitting data by said ARTU;

said rest mode is characterized by at least two phases, a coma phase and a synch phase; wherein, in said coma phase, said ARTU is incapable of receiving data and is incapable of transmitting data;

wherein said ARTU is in said coma phase for a first predetermined period of time, such that said ARTU is transformable from said coma phase after said first predetermined period of time.

21. The method according to anyone of claim 19 or 20, additionally comprising steps of searching for an animal based on at least one coordinate derived from at least one of a group consisting of:
azimuth and distance from one or more CBS units; and
intersection point of azimuth and distance from at least two CBS units.

22. The system according to claim 1, wherein said ARTU average power consumption over a period of at least one week is less than 0.5 mW.

23. The system according to claim 1, wherein, during at least 50% of the total period of operation of said ARTU, said ARTU is in said coma phase.

24. The system according to claim 1, wherein, during at most 10% of the total period of operation of said ARTU, said ARTU is in said cadet phase.

25. The system according to claim 1, wherein, during at most 10% of the total period of operation of said ARTU, said ARTU is in said synch phase.

26. The system according to claim 2, wherein said FLS is comprises a hand held receiver and at least one of a directional antenna and a directional array of antennas.

27. The system according to claim 1, wherein, in said synch phase, said ARTU is capable of receiving data and of transmitting data.

28. A system for locating an animal comprising:
at least one Animal Receive/Transmit Unit (ARTU) operative to receive/transmit data; and
at least one Coarse Base Station (CBS) operative to receive/transmit said data from/to said ARTU;
at least one Fine Locating Unit (FLS) communicating with at least one of said CBS and said ARTU;
said system having at least two modes of operation: a rest mode and an operating mode; said operating mode is characterized by said ARTU receiving data and transmitting data;
said rest mode is characterized by at least two phases: a coma phase and a synch phase; wherein, in said coma phase, said ARTU is incapable of receiving data and is incapable of transmitting data;
wherein said ARTU is in said coma phase for a first predetermined period of time, such that said ARTU is transformable from said coma phase after said first predetermined period of time;
further wherein at least one of a group consisting of said CBS, said FLS and said ARTU performs at least one of a group consisting of: presents the user with specific directions to locate an individual animal and plots the location of at least one animal on a coordinate system.

29. The system according to claim 28, wherein said CBS and said FLS are selected from a group consisting of a unit attached to a stationary platform and a mobile unit.

30. The system according to claim 28, wherein said FLS comprises a hand held receiver and at least one of a directional antenna and a directional array of antennas.

31. The system according to claim 28, wherein said ARTU switches between said synch phase and said coma phase in said rest mode after predetermined periods of time.

32. The system according to claim 28, wherein communication between at least two of a group consisting of said CBS, said FLS and said ARTU is by means of an antenna selected from a group consisting of: a directional antenna, an omni-directional antenna, a directional array of antennas and any combination thereof.

33. The system according to claim 32, wherein said antenna operates at a frequency in a range between 2.4 GHz and 2.5 GHz.

34. The system according to claim 28, wherein the data transmitted/received between at least two of a group consisting of said CBS, said FLS and said ARTU include at least one of animal location and animal condition.

35. The system according to claim 28, wherein said CBS is capable of receiving from said animal and registering information including identity, animal condition, time, distance and azimuth from the base station unit.

36. The system according to claim 28, wherein said ARTU is attached to said animal.

37. The system according to claim 28, wherein said rest mode additionally comprises a cadet phase.

38. The system according to claim 37, wherein said ARTU switches between said synch phase, said coma phase, and said cadet phase in said rest mode after predetermined periods of time.

39. The system according to claim 37, wherein said cadet phase is characterized by power consumption being less than 100 mW.

40. The system according to claim 37, wherein said cadet phase is activated every 1 to 1000 seconds for a period of time between 0.001 and 10 seconds.

41. The system according to claim 37, wherein, during said synch phase, said ARTU performs at least one of a group consisting of: establishes time points for entry into the next said cadet phase, and is ordered by the CBS to become alert or operative.

42. The system according to claim 37, wherein said ARTU is capable of receiving data during said cadet phase.

43. The system according to claim 28, wherein said rest mode has power consumption less than 1 mW, and said operating mode has power consumption less than 100 mW.

44. The system according to claim 28, additionally comprising a power source, wherein the lifetime of said power source is at least 1 year.

45. The system according to claim 44, wherein said ARTU additionally comprises at least one programmable logic device capable of at least one of:
storing and processing received data;
monitoring power level of said power source, monitoring power consumption pattern, storing power consumption pattern, monitoring animal condition storing animal condition, monitoring duration of signal pulses and storing duration of signal pulses.

46. The system according to claim 28, wherein said ARTU further comprises an alertness mode, and wherein, during said alertness mode, said ARTU is capable of transmitting data and of receiving data.

47. The system according to claim 46, wherein alertness mode has power consumption less than 10 mW.

48. The system according to claim 28, wherein said ARTU is a mobile tag mounted on or attached to said animal.

49. The system according to claim 28, wherein said ARTU average power consumption over a period of at least one week is less than 0.5 mW.

50. The system according to claim 28, wherein, during at least 50% of the total period of operation of said ARTU, said ARTU is in said coma phase.

51. The system according to claim 28, wherein, during at most 10% of the total period of operation of said ARTU, said ARTU is in said cadet phase.

52. The system according to claim 28, wherein, during at most 10% of the total period of operation of said ARTU, said ARTU is in said synch phase.

53. The system according to claim 28, wherein, in said synch phase, said ARTU is capable of receiving data and of transmitting data.

54. The system according to claim 28, wherein, in said synch phase, said ARTU is capable of transmitting unique signals, said signals adapted to enable said CBS to recognize a specific said ARTU.

55. The system according to claim 54, wherein said unique signals are selected from a group consisting of: identity, time, power status, distance from said CBS and azimuth angle between said ARTU and said CBS.

56. The system according to claim 29, wherein, in said synch phase, said ARTU is capable of transmitting unique signals, said signals adapted to enable at least one of a group consisting of said FLS and said CBS to recognize a specific said ARTU.

57. The system according to claim 56, wherein said unique signals are selected from a group consisting of: identity, time, power status, distance from a member of a group consisting of said CBS, said FLS and any combination thereof and azimuth angle between said ARTU and a member of a group consisting of said CBS, said FLS and any combination thereof.

58. The system according to claim 1, wherein, in said synch phase, said ARTU is capable of transmitting unique signals, said signals adapted to enable at least one of a group consisting of said FLS and said CBS to recognize a specific said ARTU.

59. The system according to claim 58, wherein said unique signals are selected from a group consisting of: identity, time, power status, distance from a member of a group consisting of said CBS, said FLS and any combination thereof and azimuth angle between said ARTU and a member of a group consisting of said CBS, said FLS and any combination thereof.

60. The system according to claim 2, wherein said FLS is selected from a group consisting of a unit attached to a stationary platform and a mobile unit.

61. The system according to claim 2, wherein communication between said FLS and at least one of a group consisting of said CBS and said ARTU is by means of an antenna selected from a group consisting of: a directional antenna, an omni-directional antenna, a directional array of antennas and any combination thereof.

62. The system according to claim 61, wherein said antenna operates at a frequency in a range between 2.4 GHz and 2.5 GHz.

63. The system according to claim 2, wherein the data transmitted/received between said FLS and at least one of a group consisting of said CBS and said ARTU include at least one of animal location and animal condition.

64. The system according to claim 2, wherein said FLS performs at least one of a group consisting of: presents the user with specific directions to locate an individual animal and plots the location of at least one animal on a coordinate system.

* * * * *